United States Patent [19]

Satori

[11] 4,059,015
[45] Nov. 22, 1977

[54] ANGLE-TO-CURRENT CONVERTER

[75] Inventor: Toshio Satori, Yokohama, Japan

[73] Assignee: Fischer & Porter Co., Warminster, Pa.

[21] Appl. No.: 729,822

[22] Filed: Oct. 5, 1976

[51] Int. Cl.² .................... G01F 1/24; G08C 19/08
[52] U.S. Cl. ............................. 73/209; 340/195
[58] Field of Search ............... 73/209; 340/195, 199

[56] References Cited

U.S. PATENT DOCUMENTS

| 2,907,991 | 10/1959 | van Allen | 340/195 |
| 2,935,872 | 5/1960 | Eggers et al. | 340/195 X |
| 3,105,212 | 9/1963 | Schwartz | 340/199 |
| 3,172,092 | 3/1965 | Ledford et al. | 340/195 |
| 3,311,905 | 3/1967 | Johnston | 340/195 |
| 3,931,737 | 1/1976 | Conkling | 73/209 |
| 3,977,248 | 8/1976 | Metzger | 73/209 |

Primary Examiner—Herbert Goldstein

[57] ABSTRACT

An angle-to-current converter for generating an electrical current output in direct proportion to the degree of angular displacement of an input shaft. The converter includes a differential-inductance transducer constituted by a variable reluctance disc mounted on the input shaft, the profiled edge of the disc passing through diametrically-opposed air gaps defined by the cores of a pair of inductors. The profile of the disc edge is so contoured that as the disc rotates, the region of the edge lying within one gap increases while that lying within the other gap decreases, thereby varying the inductance ratio of the pair as a function of input angle. The transducer inductors are connected to the input of an astable multivibrator in a transmitter wherein the multivibrator generates a square wave whose duty cycle is varied in accordance with the varying inductance ratio and the square wave is integrated to produce a voltage whose magnitude is proportional to the input angle. This voltage is converted into a corresponding output current.

6 Claims, 9 Drawing Figures

ANGLE-TO-CURRENT CONVERTER

BACKGROUND OF INVENTION

This invention relates generally to angle-to-current converters generating an electrical current output in direct proportion to the degree of angular displacement of an input shaft, and in particular to a converter which makes use of a differential-inductance transducer.

While the invention will be described as it operates in conjunction with a variable-area flowmeter to transmit a current signal which is a function of flow rate to a remote station, it is to be understood that the angle-to-current converter in accordance with the invention is usable in any situation wherein the angular displacement of a shaft must be transmitted in the form of a corresponding electrical signal.

In a flowmeter of the variable-area tube type, the fluid to be metered is conducted through the tube to cause a float movable vertically therein to assume a position of equilibrium between the downward force of the flow and the upward force of the fluid flowing past the float through the surrounding annular orifice.

In many flowmeter applications, it is necessary to translate the changing vertical position of the float within the flow tube into a corresponding external indication. Where, for example, the process fluid is opaque, the float cannot be seen through the transparent tube; hence direct visual indication along the tube is precluded. In other situations, the flow tube must be made of metal or other opaque material, so that it is then necessary to provide means for registering the float position at a point external to the tube.

It is known for this purpose to use a magnetic follower in which the float in the variable-area tube is provided with a guided extension rod to which a bar magnet is attached. The bar magnet moves up and down in accordance with changes in the vertical float position and is magnetically linked with a rotatable follower magnet mounted on a shaft to which an indicating pointer is attached. The follower magnet is caused to rotate in a direction and to an extent that is a function of the bar magnet movement and hence of flow rate.

In applicant's copending application entitled "Pneumatic Transmitter for Variable Area Flowmeter," now U.S. Pat. No. 4,019,369 there is disclosed an angle-to-pneumatic signal converter which is coupled to the magnetic follower associated with a variable area flowmeter and adapted to convert the rotation of the follower shaft which corresponds to the rise and fall of the float into a transmittable pneumatic signal whose value is proportional to flow rate.

The present invention deals with an electrical transmitter which carries out a similar function, except that in lieu of a pneumatic signal, a current signal is generated, making it possible to transmit this signal to a remote indicating or control station over a current-carrying line.

SUMMARY OF INVENTION

In view of the foregoing, it is the main object of this invention to provide an angle-to-current converter adapted to translate the angular displacement of an input shaft throughout a wide angular range into a corresponding electrical current which is transmittable over a line to a remote station.

More particularly, it is an object of this invention to provide a converter of the above type adapted to cooperate with the shaft of a magnetic follower associated with a variable-area tube flowmeter, the converter imposing no significant mechanical load on the follower and therefore in no way impairing the accuracy of the flowmeter measurement.

Also an object of this invention is to provide a differential-inductance transducer for an angle-to-current converter in which the rotation of the input shaft causes the edge of a variable reluctance disc to travel within diametrically-opposed air gaps defined by the cores of a pair of inductors, the profile of the disc edge being so contoured as to increase the inductance of one inductor while decreasing the inductance of the other.

Yet another object of the invention is to provide an electronic transmitter associated with a differential-inductance of the above type which serves to transform the varying ratio of inductance to a corresponding current which is conveyed on a two-wire line to a remote station.

Still another object of the invention is to provide a low-cost and compact angle-to-current converter which operates efficiently and reliably.

Briefly stated, an angle-to-current converter in accordance with the invention is constituted by a differential inductance transducer which produces a differential inductive value that varies as a function of the angular displacement of an input shaft, and a transmitter responsive to this changing value which generates a corresponding current.

The transducer is constituted by a variable reluctance disc mounted on the input shaft and rotates therewith, the edge of the disc passing through diametrically-opposed air gaps defined by the cores of a pair of inductors. The profile of the disc edge is contoured, whereby as the disc rotates, the region of the edge lying within one of the gaps increases while the region of the edge lying within the other gap decreases, thereby varying the inductance ratio of the inductor pair in proportion to the input angle.

The inductors of the transducer are connected to an astable multivibrator which generates a square wave whose duty cycle varies in accordance with the varying inductance ratio. This square wave output voltage is filtered or integrated to produce a voltage whose magnitude is proportional to the input angle. This voltage is converted by an operational amplifier into an output current.

OUTLINE OF DRAWINGS

For a better understanding of the invention as well as other objects and further features thereof, reference is made to the following detailed description to be read in conjunction with the accompanying drawing, wherein:

FIG. 3 is a schematic diagram of the transmitter associated with the transducer of the converter;

DESCRIPTION OF INVENTION

The Variable Area Flowmeter and Associated Magnetic Follower

Figure 1:
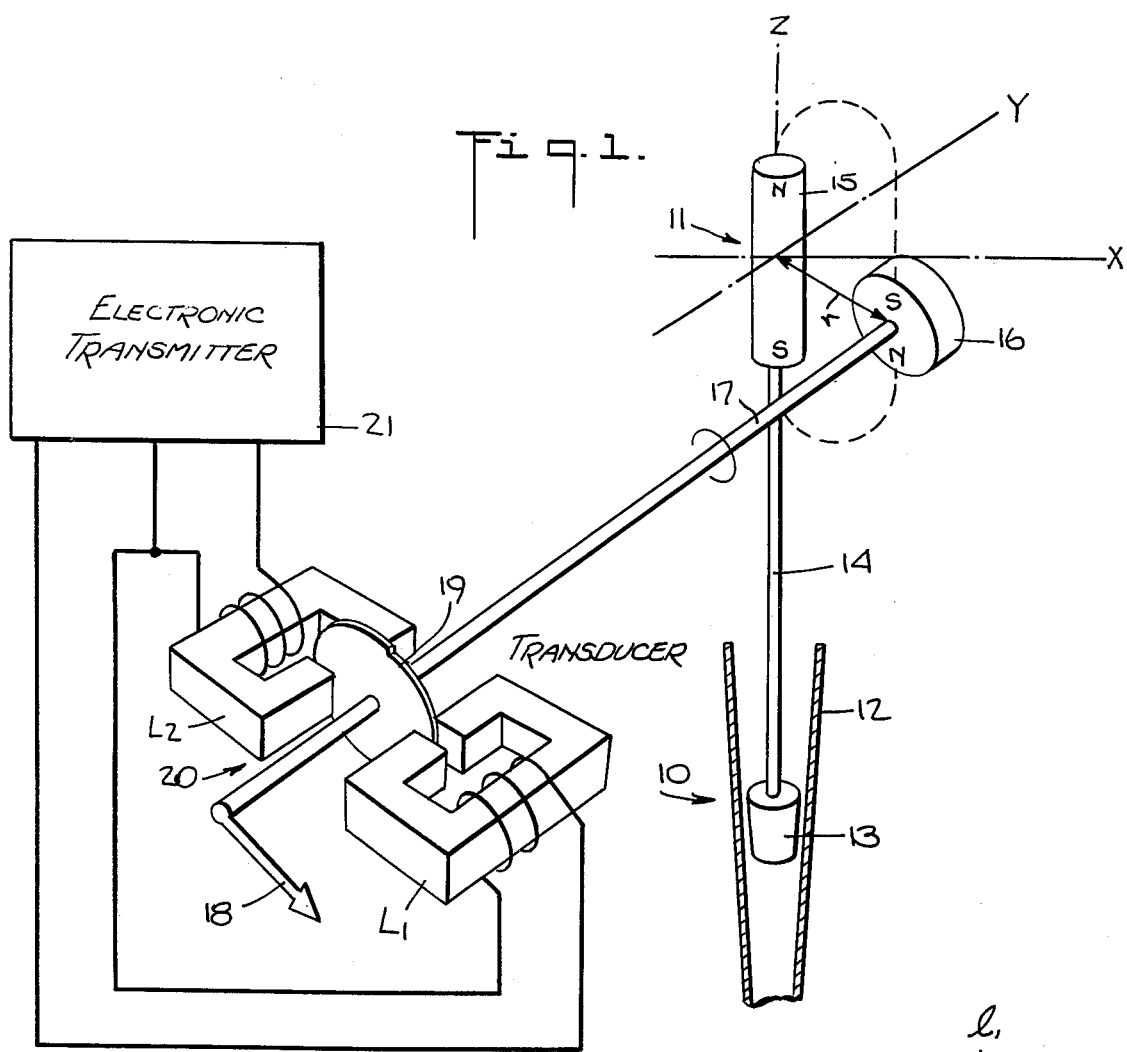
FIG. 1 is a schematic illustration of a variable area flowmeter provided with a magnetic follower whose pointer shaft has mounted thereon the disc of the differential inductance transducer included in an input angle-to-current converter in accordance with the invention.

Referring now to FIG. 1, there is shown the main elements of a conventional variable area flowmeter, generally designated by numeral 10 and of a magnetic follower 11. The system operates on the variable area principle to sense and indicate the instantaneous flow rate of fluid passing through the flowmeter.

Flowmeter 10 includes a downwardly-tapered meter tube 12 which may be formed of transparent or opaque material and a float 13 which moves up and down the tube. The variable area meter is provided with the usual pipe fittings (not shown) to admit the fluid to be measured into a lower end of the tube and to discharge this fluid from the upper end thereof.

Metering float 13 is provided with a guided extension rod 14 which extends upwardly therefrom and passes out of the top end of the flow tube. Attached to the free end of rod 14 is a vertically-oriented bar magnet 15 which is caused to move axially along a vertical axis Z in accordance with the rise and fall of the float. For purposes of illustration, the polarization of this bar magnet is made such that North is at the upper end, and South at the lower end. While the drawing shows bar magnet 15 outside of flow tube 12, in practice the arrangement may be such as to place this magnet within the tube.

Associated with bar magnet 15 is a follower assembly including a wheel-shaped follower magnet 16 mounted at one end of a shaft 17 to whose other end is attached a pointer 18 which is movable with respect to a scale (not shown). Mounted on shaft 17 adjacent pointer 18 and rotating therewith is an edge-profiled disc 19 with is a component of the differential inductance transducer, to be later described.

The attraction between the opposing poles of bar magnet 15 and follower magnet 16 provides a magnetic coupling therebetween so that when the bar magnet moves axially in the downward direction along axis Z, follower magnet 16 is caused to turn in the counter-clockwise direction to swing pointer 18 toward zero on its associated scale, and when bar magnet 15 moves upwardly, follower magnet 16 is caused to turn in the clockwise direction to swing pointer 18 upwardly on the scale.

In FIG. 1, the float is shown at its 50% lift position, with the follower assembly being statically balanced. In order for pointer 18 to register with the 50% position on its associated scale when float 13 is at its 50% lift position, the center of rotation of follower magnet 16 must be aligned with the midpoint of the magnet at the point of intersection between the vertical Z axis passing through bar magnet 15 and the orthogonal horizontal axes X and Y. The follower assembly is placed in its proper elevation relative to the bar magnet by raising or lowering the assembly in the Z direction. The mechanical means for this purpose are conventional and are therefore not illustrated.

The radial line between the point of intersection of axes, X, Y and Z in the bar magnet and the center of rotation of follower magnet 16 is represented by symbol $r$. Only one location on radius $r$ will produce a 180° rotation corresponding to a given lift (L) with a substantially linear relationship. A horizontal setting of the follower assembly in the $r$ or X direction is therefore used to adjust the span of the follower assembly. The zero position will align by symmetry. Hence the two adjustments in the Z and X or $r$ direction provide a linear relationship between float lift and follower rotation.

The Angle-to-Current Converter

In the flowmeter-magnetic follower arrangement illustrated in FIG. 1, the movement of float 13 from its lowermost position to its uppermost position in the variable area tube represents the flow rate range of the meter, this range being converted by the follower into an angular movement of shaft 17 from zero to 180°. The function of the angle-to-current converter, which is constituted by a differential inductance transducer 20 and an electronic transmitter 21, is to translate the angular displacement of input shaft 17 into a corresponding current value (i.e., 4 to 20 mAdc) for transmission to a remote station where the signal may be indicated or used for process control application.

Since in practice the variable area flowmeter tends to be somewhat inaccurate below 10% of full scale, the converter may be provided with drop-out means, as will be later disclosed, to cut off the output current at a little less than 10%, typically at 8% of full scale.

Figure 2:
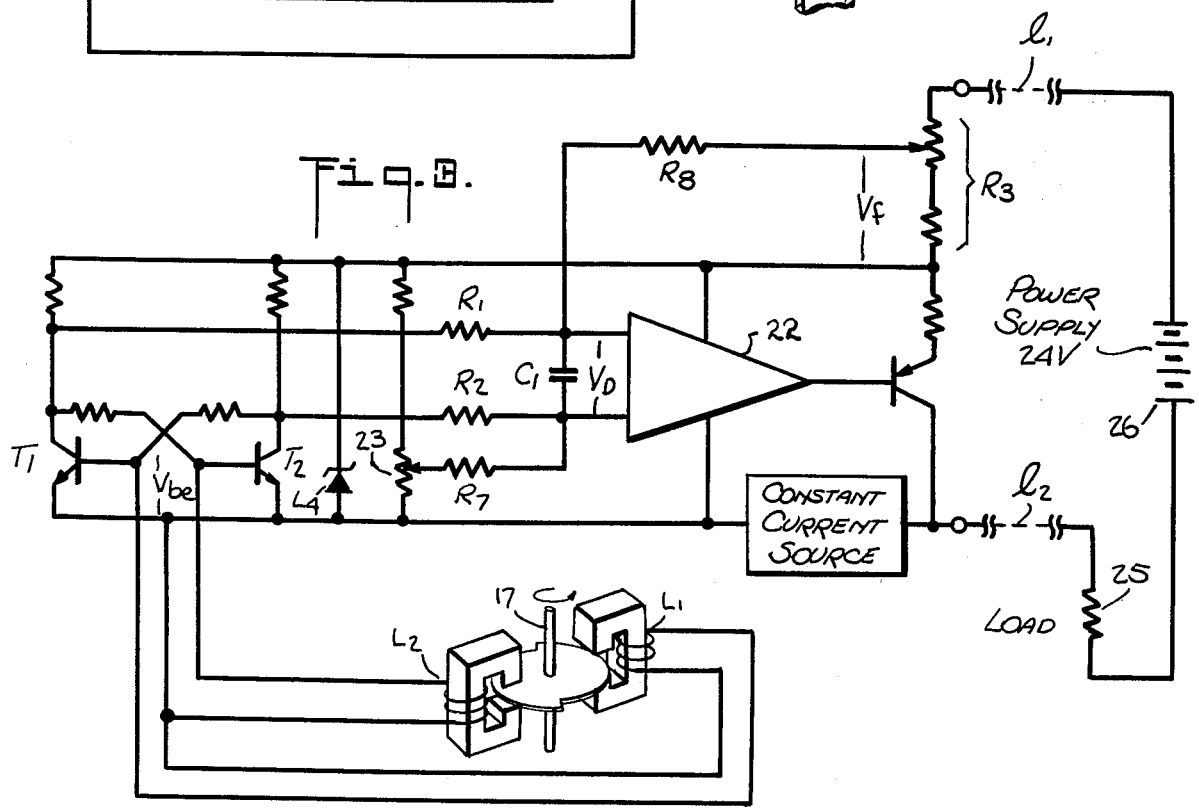
FIG. 2 illustrates the relationship between the air gaps of the transducer and the disc.

Disc 19, as shown separately in FIG. 2, which forms part of transducer 20, constitutes a variable reluctance element and is fabricated of a non-ferromagnetic metal such as aluminum, which serves in the form of eddy current losses to more or less absorb a portion of the magnetic flux in the air gaps of the inductors through which it passes, whereby the inductance of each inductor is decreased to an extent depending on the area of the disc lying within the air gap.

Associated with disc 19 is a pair of inductors $L_1$ and $L_2$, each inductor being constituted by a C-shaped ferromagnetic core ($C_1$ and $C_2$) having a coil ($W_1$ and $W_2$) wound thereabout, the spaced poles of the core defining an air gap ($G_1$ and $G_2$). Air gaps $G_1$ and $G_2$ are at diametrically-opposed positions with respect to the axis of shaft 17. As shown in FIG. 2, disc 19 lies in a plane X which is equidistant between the poles of gaps $G_1$ and $G_2$, the edge of the disc passing within the gaps so that a region of the edge lies within gap $G_1$ and a diametrically-opposed region lies within gap $G_2$.

The profile of the edge of disc 19 is contoured, whereby as the disc turns in accordance with the angular displacement of shaft 17, the edge region lying within one gap decreases, while the edge region lying within the other gap increases, thereby varying the inductance ratio of inductor pair $L_1$ and $L_2$ in proportion to the input angle. In practice, the aluminum disc may be about 1/32 inches thick with an edge profile which rises 0.4 mm per 18° to provide a total rise of 4 mm for 180° rotation. Or if a 10° cut-out is provided, the total rise for 170° rotation may be 3.6 mm, with a 0.36 mm for each 17°.

The electronic transmitter 21, as shown in FIG. 3, includes an astable multivibrator formed by cross-coupled transistors $T_1$ and $T_2$. Inductors $L_1$ and $L_2$ are connected, respectively, to the base circuits of these transistors, the multivibrator generating a square-wave whose duty cycle depends on the inductance ratio of these inductors. This ratio is proportional to the angular displacement of input shaft 17.

The square-wave output of the multivibrator is integrated by a filter circuit considered by resistors $R_1$ and $R_2$ and a capacitor $C_1$ to produce a voltage $V_0$ across the capacitor which is proportional to the duty cycle. Voltage $V_0$ is applied to the input of an operational amplifier 22 whose output is fed to an output transistor $T_3$ to produce an output current proportional to voltage $V_0$. Thus the current varies in accordance with the angular displacement of the input shaft.

Amplifier 22 acts to balance a feedback voltage $V_f$ developed across a feedback resistor $R_3$ in the output of transistor $T_3$ with the input voltage $V_0$ applied to the amplifier. Also supplied to the input of amplifier 22 is a constant voltage derived from a Zener diode 24 through a potentiometer 23, the level of the constant voltage being adjustable by the potentiometer to bias the output current so that the zero point can be properly set.

The output current is transmitted through a two-wire line, $l_1$ and $l_2$ to a remote station represented by a load resistor 25 in series with a d-c power supply 26. Thus the two-wire line acts to convey d-c power to the transmitter from the station as well as to conduct the output current signal from the transmitter to the station.

Figure 4:
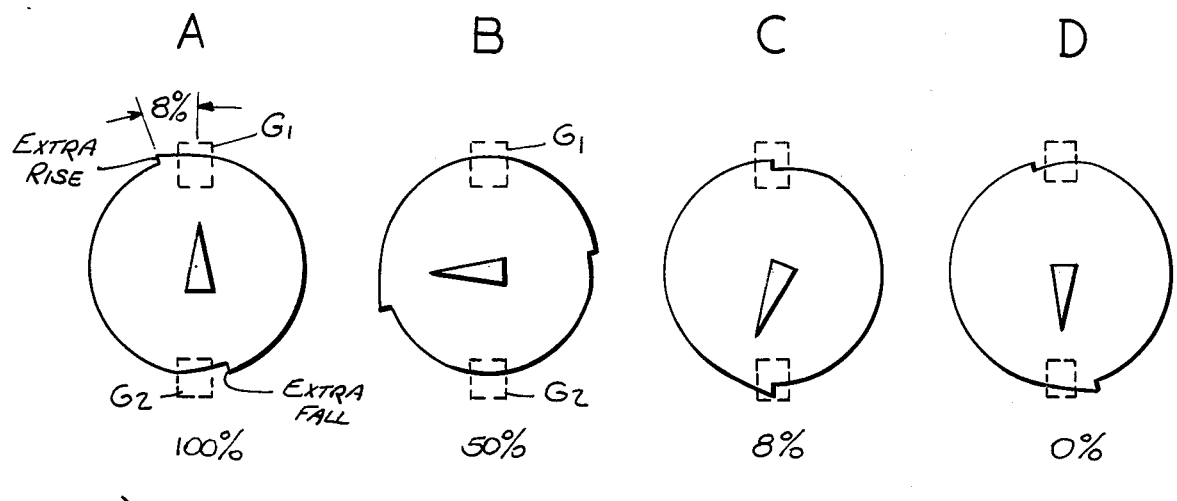
FIGS. 4A to 4D show the relationship between the profiled disc of the transducer and the associated air gap at four different angles of displacement.
Figure 2:
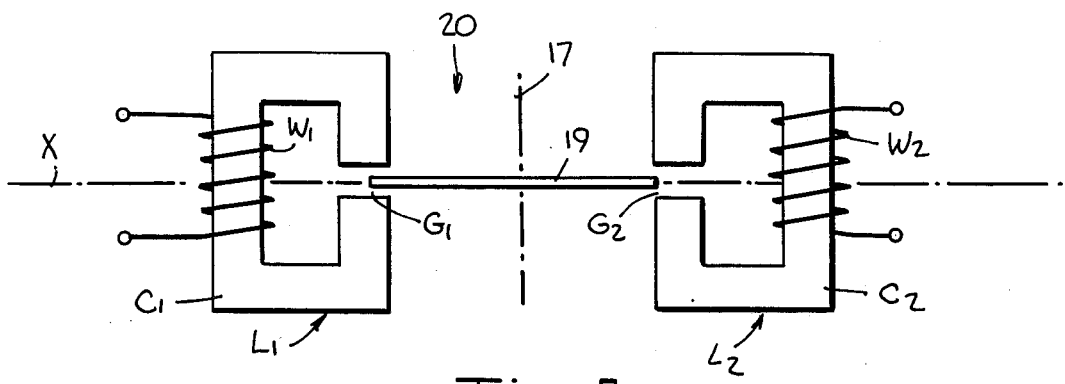

Drop-Out:

Because the output of a variable-area tube flowmeter has little significance below about 10%, the profile of disc 16 is formed, as shown in FIGS. 4A to 4D, with an extra rise and an extra fall in the last 8° on the disc at diametrically-opposed edge positions. The relationship between the rise and fall positions in the edge profile and the air gaps $G_1$ and $G_2$ at an input angle when pointer 18 on shaft 17 is at its 100% scale position is shown in FIG. 4A. The relationship at 50% scale is shown in FIG. 4B, at 8% scale in FIG. 4C, and at 0% scale in FIG. 4D. It will be seen that the step junction at the rise and fall sections are in line with the vertical axis at 8%.

Figure 5:
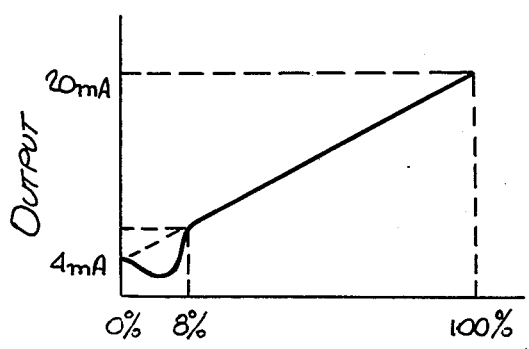
FIG. 5 is a curve showing the relationship between the angle of displacement and the current output.

As a consequence, the relationship between the input shaft for the 0% to 100% scale and the output current (4 to 20 mAdc) is a straight line rise, as illustrated in FIG. 5, except between 0% and 8%, where the current drops out.

Figure 6:
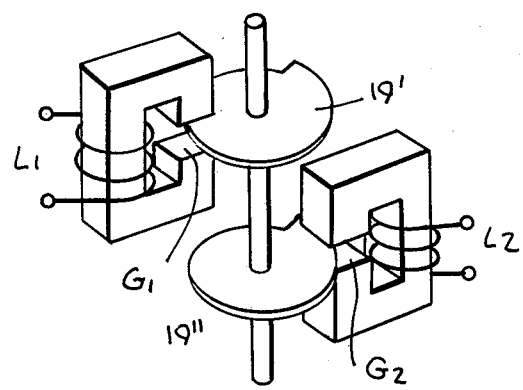
FIG. 6 is another embodiment of a differential-inductance transducer in accordance with the invention.

Alternative Form of Transducer:

In the transducer shown in FIG. 6, instead of having a single variable-permeability disc cooperate with the air gaps $G_1$ and $G_2$ of inductors $L_1$ and $L_2$ as in FIG. 2, two such edge profiled discs 19' and 19" are provided in parallel on shaft 17. Inductors $L_1$ and $L_2$ in this arrangement are oriented so that their air gaps $G_1$ and $G_2$ occupy positions relative to the respective edges of discs 19' and 19", so that as the region on the edge 19' lying within gap $G_1$ decreases, the region on the edge of disc 19" increases to provide a varying inductance ratio.

While there has been shown and described a preferred embodiment of an angle-to-current converter in accordance with the invention, it will be appreciated that many changes and modifications may be made therein without, however, departing from the essential spirit thereof.

I claim:

1. An angle-to-current converter for generating an electrical current in direct proportion to the degree of angular displacement of an input shaft, said converter comprising:

A. a differential-inductance transducer constituted by a pair of inductors, each having a core defining an air gap, and variable permeability disc means mounted on said input shaft and so cooperating with said air gaps as to increase the region of the disc means lying within one gap with a change in angle as the region lying within the other gap decreases, said disc means being constituted by an edge-contoured disc, said air gaps being diametrically-opposed with respect to the edge of said disc, whereby the inductance ratio of said inductance pair varies in accordance with said angular displacement; and B. a transmitter coupled to said pair of inductors and responsive to said varying inductance ratio to generate a corresponding current.

2. A converter as set forth in claim 1, wherein said edge contour includes a step to cause said current to drop out for the first few degrees in the angular displacement of the shaft.

3. A converter as set forth in claim 1, wherein said shaft is coupled to a rotatable magnet follower magnetically linked to a permanent magnet secured to a float in a variable area tube flowmeter whereby as said float rises and falls in said tube in accordance with flow rate, said shaft is caused to turn accordingly, and said corresponding current therefore reflects said flow rate.

4. A converter as set forth in claim 1, wherein said transmitter includes an astable multivibrator whose square wave output has a duty cycle that depends on said inductance ratio, said multivibrator being formed by a pair of cross-coupled transistors, said pair of inductors being included in the respective base circuits of said transistors.

5. A converter as set forth in claim 4, further including means to integrate the square wave output of the multivibrator to produce a voltage whose magnitude depends on said inductance ratio.

6. A converter as set forth in claim 5, further including an operational amplifier to convert said voltage to said corresponding current.

* * * * *